UNITED STATES PATENT OFFICE.

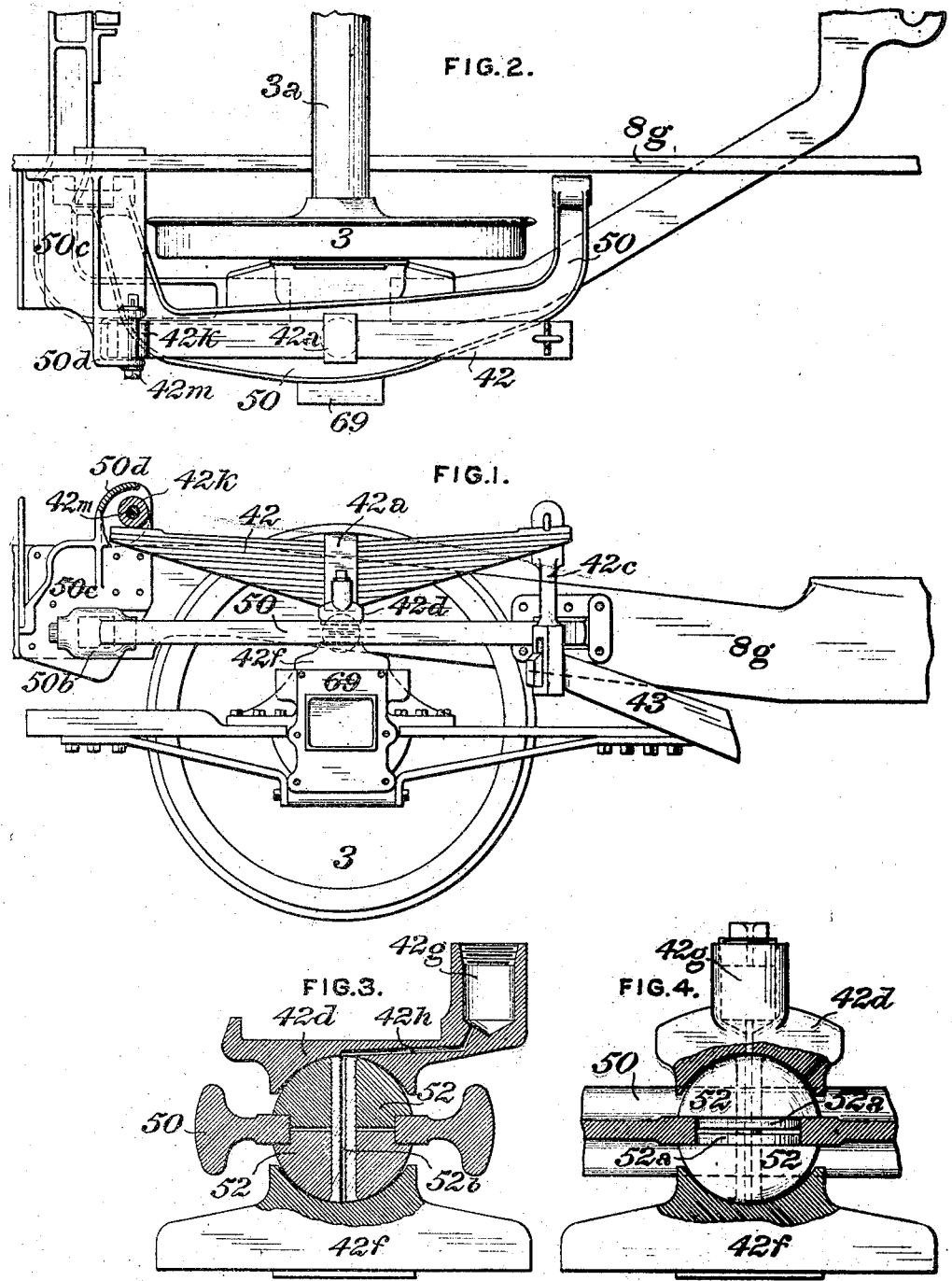

FRANCIS J. COLE AND FRANK F. SCOVILLE, OF SCHENECTADY, NEW YORK.

LOCOMOTIVE-ENGINE.

991,139.  Specification of Letters Patent.  Patented May 2, 1911.

Application filed February 9, 1911. Serial No. 607,496.

*To all whom it may concern:*

Be it known that we, FRANCIS J. COLE and FRANK F. SCOVILLE, both of Schenectady, in the county of Schenectady and State of New York, have jointly invented a certain new and useful Improvement in Locomotive-Engines, of which improvement the following is a specification.

Our invention relates to trailing trucks for locomotive engines, of the general class or type of that which is set forth in Letters Patent of the United States No. 936,413, granted and issued to us under date of October 12, 1909, and its object is to provide simplified and improved means for effecting the necessary universal adjustment between the trailing spring, yoke, and journal box.

The improvement claimed is hereinafter fully set forth.

In the accompanying drawings: Figure 1 is a side view, in elevation, of so much of a locomotive engine trailing truck as will suffice to illustrate an application of our invention; Fig. 2, a partial plan or top view of the same; Fig. 3, a transverse central section, on an enlarged scale, through the yoke and spring seat; and, Fig. 4, a longitudinal central section through the same.

Except as hereinafter described, our improved trailing truck accords, in all substantial particulars, with that set forth in Letters Patent No. 936,413 aforesaid, and the features constituting our present invention only need therefore to be herein fully and at length specified.

In the practice of our invention, the truck axle, $3^a$, upon which the truck wheels, 3, are secured, is, as in Letters Patent No. 936,413, provided with outside journals, which rotate in bearings fitted in journal boxes, 69, in the usual manner, and the rear main frame members, $8^g$, of the locomotive, are supported upon the truck axle through the intermediation of springs, 42, the bands, $42^a$, of which are seated upon the tops of the journal boxes, 69, means, which constitute a leading and characteristic feature of our present invention, and which will now be described, being interposed between the spring bands and journal boxes. By the application of said means, the operative results of universal adjustment of the springs and journal boxes which are attained by the construction set forth in Patent No. 936,413, are, under our present invention, provided with a substantial simplification and economization of structure and cost.

Floating yokes, 50, extend longitudinally below the springs, 42, and are coupled at their ends, to the rear main frame members, $8^g$, and intermediate their ends, by a universal joint connection, to the springs, 42, and journal boxes, 69. To this end, the spring bands, $42^a$, are fitted in spring seats, which rest on the journal boxes, 69, each of said spring seats comprising an upper section, $42^d$, having its top recessed for the reception of the spring band, and a lower section, $42^f$, which abuts on the top of the journal box. The adjacent faces of the upper and lower spring seat sections are each recessed in the form of a segment of a sphere, and a substantially spherical ball bearing, 52, is interposed between the spring seat sections, fitting truly in the recesses thereof. The ball bearing, 52, is divided, diametrically and horizontally, into two sections, having short cylindrical pivots, $52^a$, on their adjacent faces, which fit truly in a concentric cylindrical bore formed in the web of the floating yoke, 50. An oil cup, $42^g$, is formed on or secured to the outer side of the upper spring section, and an oil passage, $42^h$, extends therefrom, through the section, to the upper end of a vertical oil passage, $52^b$, extending through the sections of the ball bearing to the recessed face of the lower spring seat section on which the ball bearing rests.

It will be seen that, by reason of the pivotal connection of the floating yokes with the ball bearings, and the capacity of free movement of the springs and journal boxes about the centers of the ball bearings, complete freedom of universal self adjustment of said members is afforded, without necessitating the use of bolts, trunnion blocks, or other members which would tend to wear or work loose in service and involve expense of manufacture and maintenance.

The floating yokes, 50, are curved inwardly, in front and rear of the adjacent truck wheels, and are coupled by longitudinally extending pivots, to lugs, $50^b$, on brackets, $50^c$, secured to the rear main frame members, $8^g$. In lieu of coupling the rear ends of the truck springs to the brackets, $50^c$, by spring hangers, as in Patent No. 936,413, the frames bear on the rear ends of the springs, under our present invention, through rollers, $42^k$, journaled on pins, $42^m$, which are fixed in sockets, 50ᵈ, on the tops of the frame brackets, 50ᶜ. This construction admits of such slight differences in the length of the springs as may result from differences in set, and avoids the objection incident to the limited clearance between the yoke and the bottom of the bracket. It also admits of the use of a much shorter yoke and allows sufficient room for the attachment of the trailing truck brake hangers in rear of the yokes.

We claim as our invention and desire to secure by Letters Patent:

1. In a locomotive engine, the combination of a main frame, a radial truck pivoted thereto, springs through which weight borne by the main frame is transmitted to the journal boxes of the truck, floating yokes pivoted at their ends to the main frame, and universal joints comprising pairs of ball bearings, interposed between the springs and the floating yokes.

2. In a locomotive engine, the combination of a main frame, a radial truck pivoted thereto, springs through which weight borne by the main frame is transmitted to the journal boxes of the truck, floating yokes pivoted at their ends to the main frame, and ball bearings pivoted in said yokes and interposed between the springs and journal boxes.

3. In a locomotive engine, the combination of a main frame, a radial truck pivoted thereto, springs through which weight borne by the main frame is transmitted to the journal boxes of the truck, floating yokes pivoted at their ends to the main frame, seats in which said springs are supported on the journal boxes, and universal joints comprising pairs of ball bearings, interposed between the spring seats and the floating yokes.

4. In a locomotive engine, the combination of a main frame, a radial truck pivoted thereto, springs through which weight borne by the main frame is transmitted to the journal boxes of the truck, floating yokes pivoted at their ends to the main frame, sectional spring seats interposed between the springs and journal boxes, and ball bearings pivoted in the yokes, and fitting corresponding recesses in the sections of the spring seats.

5. In a locomotive engine, the combination of a main frame, a radial truck pivoted thereto, springs through which weight borne by the main frame is transmitted to the journal boxes of the truck, floating yokes pivoted at their ends to the main frame, upper spring seat sections receiving the spring bands, lower spring seat sections resting on the journal boxes, said upper and lower sections being spherically recessed on their adjoining faces, and diametrically divided ball bearings pivoted in the floating yokes and fitting in the recesses of the spring seat sections.

6. In a locomotive engine, the combination of a main frame, a radial truck pivoted thereto, springs through which weight borne by the main frame is transmitted to the journal boxes of the truck, brackets fixed to the main frame in rear of said springs, floating yokes pivoted at their ends to the main frame and to said brackets, universal joints interposed between the springs and the floating yokes, pins fixed in sockets in the frame brackets and rollers journaled on said pins and bearing on the rear ends of the springs.

7. A frame bracket for radial trucks of locomotive engines having a socket for the reception of the journals of a spring roller at its top and a lateral pivot lug for a floating yoke adjoining its lower side.

FRANCIS J. COLE.
FRANK F. SCOVILLE.

Witnesses:
S. W. TYLER,
W. F. DRYSDALE.